United States Patent [19]
Worrall et al.

[11] Patent Number: 5,168,932
[45] Date of Patent: Dec. 8, 1992

[54] DETECTING OUTFLOW OR INFLOW OF FLUID IN A WELLBORE

[75] Inventors: Robert N. Worrall; Johannes H. G. Surewaard, both of Rijswijk; Peter Oosterling, The Hague, all of Netherlands

[73] Assignee: Shell Oil Company, Houston, Tex.

[21] Appl. No.: 729,661

[22] Filed: Jul. 15, 1991

[30] Foreign Application Priority Data

Jul. 25, 1990 [GB] United Kingdom ............... 9016272

[51] Int. Cl.[5] .............................................. E21B 47/10
[52] U.S. Cl. ...................................... 166/336; 175/48; 73/155
[58] Field of Search ................... 166/336, 337; 175/5, 175/38, 48; 73/155

[56] References Cited

U.S. PATENT DOCUMENTS

| | | | |
|---|---|---|---|
| 4,440,239 | 4/1984 | Evans | 73/155 X |
| 4,527,425 | 7/1985 | Stockton | 73/155 |
| 4,610,161 | 9/1986 | Gehrig et al. | 73/155 |
| 5,006,845 | 4/1991 | Calcar et al. | 166/336 X |

Primary Examiner—William P. Neuder

[57] ABSTRACT

A method is provided for detecting outflow of fluid from an offshore wellbore to a surrounding earth formation or inflow of fluid from the formation of the wellbore. The wellbore is in fluid communication with a conduit extending between the wellbore and an offshore structure floating above the wellbore, which wellbore and conduit are at least partly filled with a body of fluid. Liquid is injected into the body of fluid at a first predetermined flowrate, and liquid is discharged from the body of fluid at a second predetermined flowrate. A variation of the content of the body of fluid is then determined.

14 Claims, 2 Drawing Sheets

DETECTING OUTFLOW OR INFLOW OF FLUID IN A WELLBORE

BACKGROUND OF THE INVENTION

The invention relates to a method and an apparatus for detecting fluid influx from an earth formation to a wellbore or fluid efflux from the wellbore to the formation. Fluid efflux is often referred to as lost circulation. A sudden influx of gas, water or oil during drilling of the wellbore, or during any other operation in the wellbore, is referred to as a kick.

Gas which has entered the wellbore flows upwards and expands during the upward flow because of the decreasing hydrostatic pressure. The expanding gas displaces an increasing volume of liquid in the wellbore. If the kick is not detected at an early stage, the accumulated gas in the wellbore may displace a significant part of the liquid column in the wellbore, which may lead to a blowout if control of fluid flow in the wellbore is lost.

Early detection of a kick is of utmost importance to enable appropriate measures to be taken quickly so that control of fluid flow in the wellbore is maintained. Usually the wellbore is shut in using a blowout preventer, and a heavier fluid is pumped into the wellbore so as to increase the hydrostatis pressure in the wellbore.

The importance of early detection of a kick is even more pronounced when the wellbore has a relatively small diameter since the volume of the liquid column in the wellbore is then relatively small, and therefore the fluid column will be displaced quicker if gas has entered the wellbore. Drilling of wellbores with a relatively small diameter is referred to as slimhole drilling.

A conventional technique for detecting fluid influx or efflux during offshore drilling consists of monitoring the total volume of drilling fluid in the mud pit which is a reservoir for drilling fluid returning from the well. Furthermore, the flow-out of drilling fluid can be monitored in an outlet pipe of the drilling riser, which outlet pipe is referred to as the bell nipple. When the well is being drilled from a floating drilling platform this technique is inaccurate because of movement of the floating drilling platform or floating structure, which movements cause variations of the fluid level in the mud pit and variations of the flowrate in the bell nipple.

Conventional techniques for detecting kicks are in many cases too slow to be used slimhole drilling. Furthermore, these conventional techniques are often inaccurate.

It is an object of the invention to overcome these and other drawbacks of known methods and systems for detecting outflow of fluid from a wellbore or inflow of fluid to the wellbore.

SUMMARY OF THE INVENTION

In accordance with the invention this object is accomplished by a method for detecting outflow of fluid from an offshore wellbore to a surrounding earth formation or inflow of fluid from the formation to the wellbore, the wellbore being in fluid communication with a conduit extending between the wellbore and an offshore structure floating above the wellbore, which wellbore and conduit are at least partly filled with a body of fluid, the method comprising the steps of: injecting liquid into said body of fluid at a first predetermined flowrate; discharging liquid from said body of fluid at a second predetermined flowrate; and determining a variation of the fluid content of said body of fluid.

The fluid in the wellbore is normally a liquid also when an influx of water or oil occurs. However, this fluid is a mixture of liquid and gas if an influx of gas occurs.

By injecting and discharging liquid at predetermined flowrates, variations of said fluid content other than resulting from injecting or discharging fluid can be determined. If outflow or inflow of fluid occurs, the fluid content of the body of fluid will vary immediately, which enables early detection of the outflow or inflow by determining the variation of the fluid content of the body of fluid. Furthermore, during offshore operations from a floating structure the fluid content of the body of fluid is not affected by movements of the floating structure so that these movements do not negatively effect the accuracy of the method.

Advantageously said first flowrate is substantially equal to said second flowrate.

More advantageously the variation of the fluid content of the body of fluid is determined from a variation of a fluid level of the body of fluid in the conduit.

More advantageously the variation of the fluid level of the body of fluid in the conduit is determined from a variation of a hydrostatic pressure in the body of fluid at a predetermined location in the conduit.

The invention relates furthermore to an apparatus for detecting outflow of fluid form an offshore wellbore to a surrounding earth formation or inflow of fluid from the formation to the wellbore, said wellbore being in fluid communication with a conduit extending between the wellbore and an offshore structure floating above the wellbore, which wellbore and conduit are at least partly filled with a body of fluid, comprising: means for injecting liquid into said body of fluid at a first predetermined flowrate; means for discharging liquid from said body of fluid at a second predetermined flowrate; and means for determining a variation of the fluid content of said body of fluid.

DETAILED DESCRIPTION OF THE DRAWINGS

Figure 1:
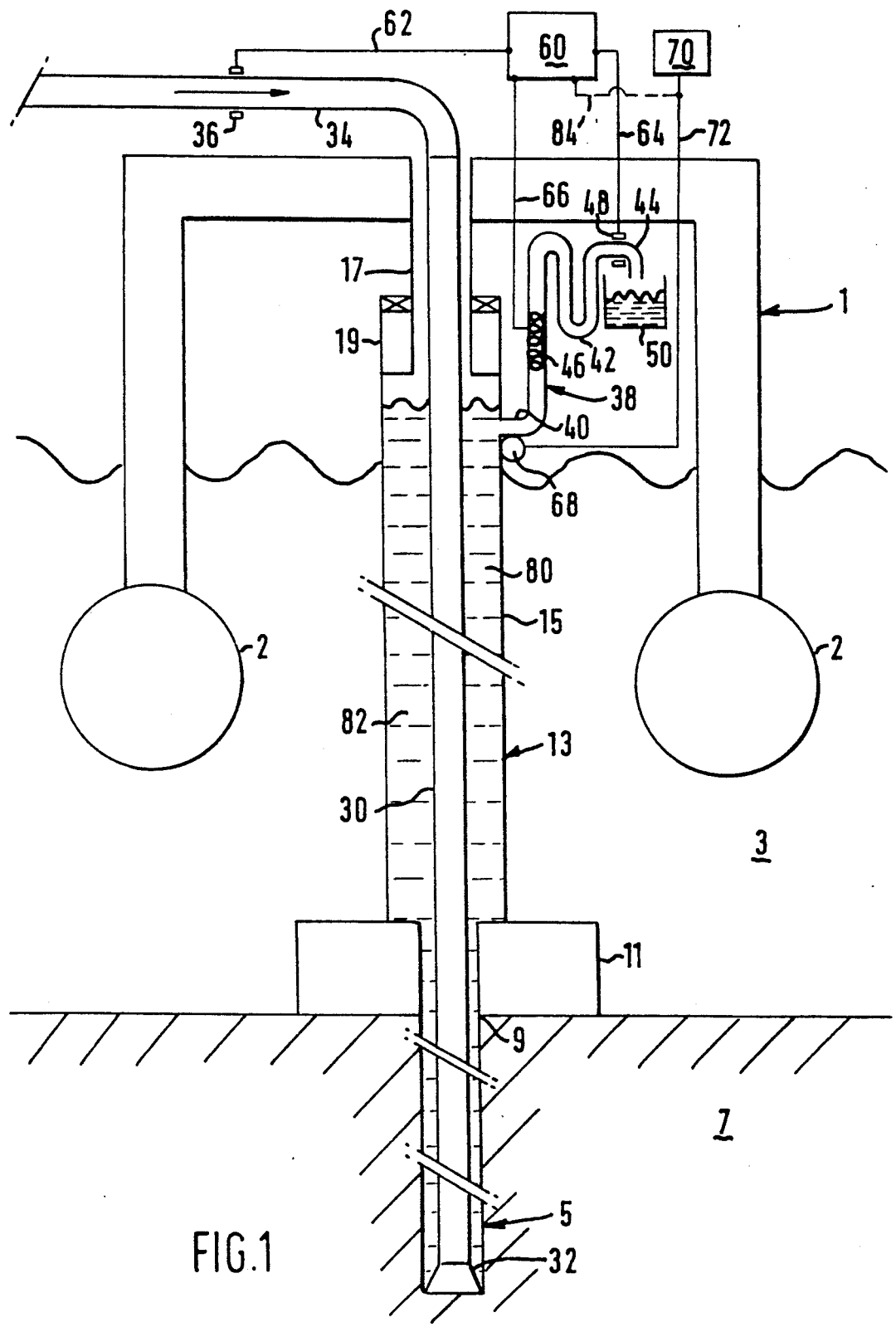
FIG. 1 shows schematically a first embodiment of the system according to the invention.

Referring to FIG. 1 there is shown an offshore drilling platform 1 provided with floaters 2 floating in a body of seawater 3. A wellbore 5 is arranged in an earth formation 7 below the platform 1, which wellbore 5 is at its upper end 9 provided with a blowout preventer 11. A conduit in the form of a marine riser 13 extends between the blowout preventer 11 and the drilling platform 1. The riser 13 consists of a lower section 15 and an upper section 17, the sections 15 and 17 being interconnected by means of a telescopic joint 19 to accommodate heave motions of the platform 1.

A tubular drill string 30 extends from the platform 1 through the riser 13 and the blowout preventer 11 into the wellbore 5. The drill string 30 has at its lower end a drill bit 32 provided with nozzles (not shown) to allow liquid to flow from the tubular drill string 30 into the wellbore 5. The upper end of the drill string 30 is connected to a liquid supply conduit 34 provided at the platform 1, which liquid supply conduit 34 is connected to a pump (not shown) for pumping liquid at a controlled flowrate through the liquid supply conduit 34, through the drill string 30 and via the nozzles of the drill bit 32 into the wellbore 5. An electromagnetic type flowmeter 36 is provided at the liquid supply conduit 34 for metering the flowrate at which liquid is pumped through the liquid supply conduit 34.

A branch conduit 38 passes through the wall of the lower section 15 of the riser 13 at a location above the water surface and near to the telescopic joint 19. The interior of the branch conduit 38 is in fluid communication with the interior of the riser 13. The branch conduit 38 comprises an inlet section 40, a U-shaped section central section 42, and an outlet section 44. The inlet section 40 is provided with a positive displacement pumpl, for example, a Moineau type pump 46, for pumping liquid from the inlet section 40, through the central section 42 toward the outlet section 44. The outlet section 44 is provided with a flowmeter, for example, an electro-magnetic type flowmeter 48 for metering the flowrate at which liquid is pumped through the branch conduit 38. The outlet section 44 of the branch conduit 38 debouches into a reservoir 50.

A control system 60 is provided at the platform 1 for controlling the flowrate at which liquid is pumped through the branch conduit 38. The control system 60 is connected to the flowmeter 36 at the liquid supply conduit 34 by means of an electrical connection 62, to the flowmeter 48 at the branch conduit 38 by means of an electrical connection 64, and to the Moineau pump 46 by means of an electrical connection 66.

A device for measuring pressure variations in the riser at a location where the branch conduit 38 passes through the wall of the riser 13 in the form of a pressure gauge 68 is provided at said location of the riser 13. The pressure gauge 68 is connected to a monitor 70 installed at the platform 1 by means of an electrical connection 72 so that pressure variations in the riser 13 can be monitored at the platform 1.

An annular space 80 is formed between the drill string 30 on one hand and the wellbore 5, the blowout preventor 11, and the riser 13 on the other hand. The annular space 80 is partly filled with a body of liquid 82, which body 82 extends from the lower end of the wellbore 5 to above the location where the branch conduit 38 passes through the wall of the riser 13.

During normal operation of the first embodiment of the system according to the invention the drill bit 32 is rotated by means of the rotating drill string 30 or by means of a downhole motor (not shown). Drilling liquid is pumped through the liquid supply conduit 34, through the drill string 30 and via the nozzles of the drill bit 32 into the body of fluid 82 at the lower end of the wellbore 5. The flowrate at which the drilling liquid flows through the liquid supply conduit 34 is measured with the flowmeter 36. Liquid is discharged from the body of fluid 82 by operating the Moineau pump 46, thereby pumping liquid through the branch conduit 38 to the reservoir 50. The flowrate at which the liquid flows through the branch conduit 38 is measured with the flowmeter 48.

In a first mode of operation of the control system 60, the Moineau pump 46 is controlled by the control system 60 in a manner that the flowrate at which liquid is pumped through the branch conduit 38 is substantially equal to the flowrate at which drilling liquid is pumped through the liquid supply conduit 34. Thereto, the control system 60 compares the flowrates measured by the flowmeters 36 and 48 and induces the Moineau pump 46 to adjust the flowrate in the branch conduit 38 accordingly. Thus, if there is no outflow of fluid from the body of fluid 82 into the surrounding formation 3 or inflow of fluid from the formation 3 to the body of fluid 82, the flow of fluid into the body of fluid 82 is equal to the flow of fluid out of the body of fluid 82. Consequently, the fluid content of the body of fluid 82 remains substantially constant and the fluid level in the riser 13 remains substantially constant. If, however, outflow of fluid from the body of fluid 82 into the surrounding formation 3 or inflow from the formation 3 to the body of fluid 82 occurs, there will be a variation of fluid content of the body of fluid 82 and the fluid level in the riser 13 will vary. The variation of the fluid level in the riser 13 is accompanied by a variation of hydrostatic pressure in the riser 13, which variation is measured with the pressure gauge 68 and a signal is transmitted to the monitor 70 at the platform 1. Depending on the characteristics of the signal appropriate measures can be taken.

In a second mode of operation of the control system 60, the control system 60 is connected to the pressure gauge 68 via an electrical connection 84. The Moineau pump 46 is controlled by the control system 60 in a manner so as to minimize a variation of the hydrostatic fluid pressure in the riser 13 measured with the presure gauge 68. Thus, in the second mode of operation the control system 60 controls the fluid level in the riser 13 to be substantially constant. The control system 60 compares the flowrates in the liquid supply conduit 34 and the branch conduit 38, and transmits a signal to the monitor 70 if a difference between these flowrates occurs. If there is no outflow of fluid from the body of fluid 82 into the surrounding formation 3 or inflow from the formation 3 of the body of fluid 82, the flow of fluid into the body of fluid 82 is equal to the flow of fluid out of the body of fluid 82. Consequently, the flowrates in the liquid supply conduit 34 and the branch conduit 38 are substantially constant. If, however, outflow of fluid from the body of fluid 82 into the surrounding formation 3 or inflow from the formation 3 to the body of fluid 82 occurs, there will be a variation of the flowrate in the branch conduit 38. Thus, a difference between the flowrates in the liquid supply conduit 34 and the branch conduit 38 occurs and a signal is transmitted by the control system 60 to the monitor 70. Depending on the characteristics of the signal, appropriate measures can be taken.

Figure 2:
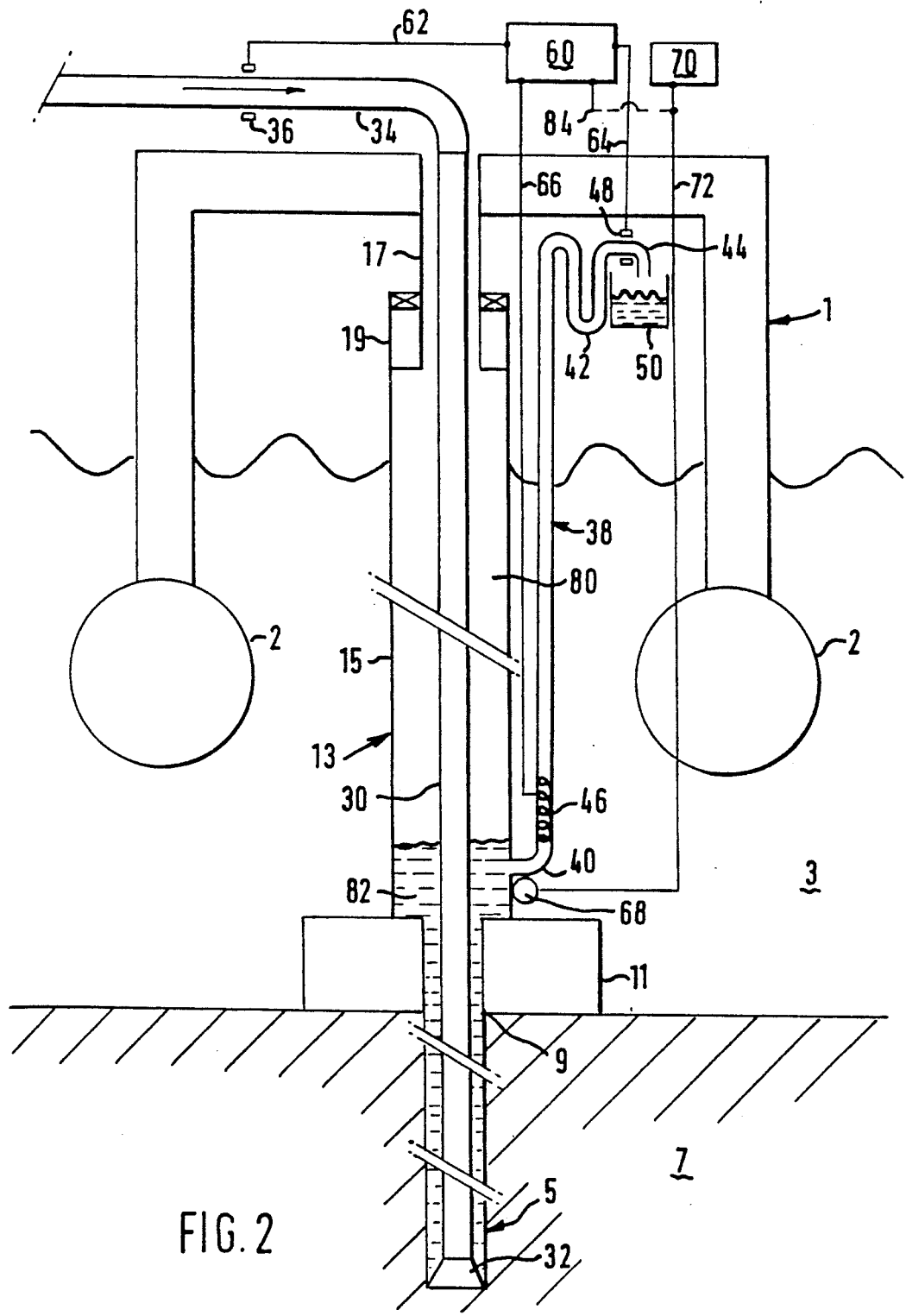
FIG. 2 shows schematically a second embodiment of the system according to the invention.

The second embodiment as schematically shown in FIG. 2 is substantially similar to the first embodiment as described with reference to FIG. 1, with the exception that the branch conduit 38 passes through the wall of the lower section 15 of the riser 13 at a location below the water surface and near to the blowout preventer 11. The pressure gauge 68 is also arranged below the water surface and near to the blowout preventer 11.

Normal operation of the second embodiment of the system according to the invention is substantially similar to normal operation of the first embodiment as described with reference to FIG. 1. However, the fluid level in the riser 13 is maintained significantly lower than with the first embodiment, namely just above the location where the branch conduit 38 passes through the wall of the riser 13. The advantage thereof is that the fluid pressure in the wellbore 5 can be maintained at a level which is closer to the minimum required pressure in the wellbore 5, thereby enabling the operator to operate with a larger range of wellbore pressures.

In an alternative embodiment of the system according to the invention the means for determining the variation of the fluid level in the conduit comprises at least one ultrasonic level gauge arranged in the conduit.

During another operation of the first or second embodiment of the system according to the invention the drill string is removed from the wellbore or is lowered into the wellbore. As a consequence of removing or lowering the drill string the fluid level of the body of fluid changes. By using the pressure gauge and/or ultrasonic level gauge it is possible to check whether the fluid level of the body of fluid changes by such an amount as to compensate for the volume of drill string being removed or lowered. If the fluid level changes by another amount, it may be deduced that inflow or outflow of fluid takes place.

We claim:

1. A method for detecting outflow of fluid from an offshore wellbore to a surrounding earth formation or inflow of fluid from the formation to the wellbore, the wellbore being in fluid communication with a conduit extending between the wellbore and an offshore structure floating above the wellbore, which wellbore and conduit are at least partly filled with a body of fluid, the method comprising the steps of:

injecting liquid into said body of fluid at a first predetermined flowrate;
   discharging liquid from said body of fluid at a second pre-determined flowrate; and
   determining a variation of the fluid content of the body of fluid;
   detecting outflow of fluid from the wellbore to the formation or inflow of fluid from the formation to the wellbore as the variation in the fluid content of the body of fluid.

2. The method of claim 1 wherein the first flowrate is substantially equal to the second flowrate.

3. The method of claim 1 wherein the variation of the fluid content of the body of fluid is determined from a variation of a fluid level of the body of fluid in the conduit.

4. The method of claim 3 wherein the variation of the fluid level of the body of fluid in the conduit is determined from a variation of a hydrostatic pressure in the body of fluid at a predetermined location in the conduit.

5. The method of claim 1 further comprising the step of controlling the first flowrate and/or the second flowrate in a manner that the fluid level of the body of fluid is at or near the upper end of the wellbore.

6. The method of claim 1 when used during drilling of the wellbore, whereby liquid is injected into the body of fluid through a hollow drill string, and whereby liquid is discharged from the body of fluid by pumping liquid of the conduit through a branch conduit.

7. An apparatus for detecting outflow of fluid from an offshore wellbore to a surrounding earth formation or inflow of fluid from the formation to the wellbore, the wellbore being in fluid communication with a conduit extending between the wellbore and an offshore structure floating above the wellbore, which wellbore and conduit are at least partly filled with a body of fluid, comprising:

means for injecting liquid into said body of fluid at a first predetermined flowrate;
   means for discharging liquid from said body of fluid at a second predetermined flowrate; and
   means for determining a variation of the fluid content of said body of fluid.

8. The apparatus of claim 7 wherein the means for discharging liquid from the body of fluid comprises pumping means for pumping liquid through a branch conduit.

9. The apparatus of claim 8 wherein the means for discharging liquid from the body of fluid further comprises a flowmeter for metering flow of liquid through the branch conduit.

10. The apparatus of claim 7 further comprising a control system for controlling the first flowrate and the second flowrate.

11. The apparatus of claim 7 wherein the means for determining the variation of the fluid content comprises means for determining a variation of the fluid level in the conduit.

12. The apparatus of claim 8 wherein the conduit comprising a telescoping joint to accommodate vertical motions of the offshore structure and wherein said branch conduit is in fluid communication with said conduit at a location between the telescoping joint and the wellbore.

13. The apparatus of claim 12 wherein the branch conduit is in fluid communication with said conduit at a location substantially near the seabed.

14. A method for detecting outflow of fluid from an offshore wellbore to a surrounding earth formation or inflow of fluid from the formation to the wellbore, the wellbore being in fluid communication with a conduit extending between the wellbore and an offshore structure floating above the wellbore above the wellbore, which wellbore and conduit are at least partly filled with a body of fluid, the method comprising steps of:

injecting liquid into said body of fluid at a determined flowrate;
   discharging liquid from said body of fluid at a flowrate effective to hold a fluid level in the conduit substantially constant; and
   detecting outflow of fluid from the offshore wellbore to the formation or inflow of fluid from the formation to the wellbore as a change in the difference between the flowrate of fluid liquid being discharged and the pre-determined flowrate of liquid being injected into the body of fluid.

* * * * *